(12) United States Patent
Rick et al.

(10) Patent No.: US 7,877,100 B2
(45) Date of Patent: Jan. 25, 2011

(54) POSITION DETERMINATION SYSTEM THAT USES A CELLULAR COMMUNICATION SYSTEM

(75) Inventors: Roland R. Rick, Superior, CO (US);
Ivan Fernandez-Corbaton, Lleida (ES);
Jeremy M. Stein, Haifa (IL); Messay Amerga, San Diego, CA (US); Borislav Ristic, San Diego, CA (US); Ashok Bhatia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/482,299

(22) Filed: Jun. 10, 2009

(65) Prior Publication Data

US 2009/0305726 A1     Dec. 10, 2009

Related U.S. Application Data

(63) Continuation of application No. 10/102,361, filed on Mar. 19, 2002, now abandoned.

(60) Provisional application No. 60/340,804, filed on Dec. 14, 2001.

(51) Int. Cl.
   *H04W 24/00* (2009.01)
(52) U.S. Cl. ............ 455/456.1; 455/404.2; 455/456.5; 455/456.6; 455/403; 455/422.1
(58) Field of Classification Search ...... 455/456.1–457, 455/404.2, 403, 422.1, 550.1
See application file for complete search history.

(56) References Cited

U.S. PATENT DOCUMENTS 5,758,288 A    5/1998  Dunn et al.
5,884,215 A    3/1999  Birchler et al.
5,900,838 A    5/1999  Khan et al.

(Continued)

FOREIGN PATENT DOCUMENTS

WO    WO9911086    3/1999

(Continued)

OTHER PUBLICATIONS

International Search Report—PCT/US2002/040040, International Search Authority—European Patent Office—Aug. 18, 2003.

*Primary Examiner*—Huy Phan
(74) *Attorney, Agent, or Firm*—Andrea L. Mays

(57) ABSTRACT

A position determination system and apparatus for utilizing a network of cellular base stations to determine position of a mobile station includes taking a plurality of statistically independent data measurements of the pilot signals from the base stations. Each of the data measurements includes an earliest time of arrival, providing multiple independent measurements for each of the pilot signals. For each cellular base station, a representative measurement is calculated responsive to the independent measurements, which is used to determine position of the mobile station using an AFLT algorithm and/or in conjunction with a GPS algorithm. In some embodiments, the data measurements for each pilot signal further include an RMSE estimate and time of measurement for each time of arrival, and an energy measurement for all resolvable paths. If the mobile station comprises a cell phone, a cell search list and a GPS search list may be provided by a cell base station.

21 Claims, 7 Drawing Sheets

U.S. PATENT DOCUMENTS

| | | | |
|---|---|---|---|
| 5,970,414 A | 10/1999 | Bi et al. | |
| 6,009,334 A | 12/1999 | Grubeck et al. | |
| 6,061,337 A | 5/2000 | Light et al. | |
| 6,097,959 A | 8/2000 | Yost et al. | |
| 6,212,398 B1 | 4/2001 | Roberts et al. | |
| 6,226,317 B1 | 5/2001 | Bruckert et al. | |
| 6,266,534 B1* | 7/2001 | Raith et al. | 455/456.3 |
| 6,275,186 B1* | 8/2001 | Kong | 342/363 |
| 6,404,388 B1* | 6/2002 | Sollenberger et al. | 342/387 |
| 6,445,927 B1* | 9/2002 | King et al. | 455/456.6 |
| 6,473,619 B1* | 10/2002 | Kong et al. | 455/456.1 |
| 6,539,229 B1 | 3/2003 | Ali | |
| 6,694,147 B1* | 2/2004 | Viswanath et al. | 455/517 |
| 6,700,538 B1 | 3/2004 | Richards | |
| 6,735,449 B2 | 5/2004 | Tran | |
| 6,748,224 B1 | 6/2004 | Chen et al. | |
| 6,785,321 B1* | 8/2004 | Yang et al. | 375/137 |
| 6,836,753 B1* | 12/2004 | Silve | 703/2 |
| 2001/0022558 A1 | 9/2001 | Karr, Jr. et al. | |
| 2002/0019239 A1 | 2/2002 | Kasapidis | |
| 2002/0077125 A1 | 6/2002 | Hunzinger | |
| 2002/0094843 A1 | 7/2002 | Hunzinger | |
| 2002/0142726 A1* | 10/2002 | Hunzinger | 455/65 |
| 2002/0183070 A1 | 12/2002 | Bloebaum et al. | |
| 2002/0196188 A1 | 12/2002 | Holt | |
| 2003/0040323 A1* | 2/2003 | Pihl et al. | 455/456 |
| 2003/0040331 A1 | 2/2003 | Zhao | |
| 2003/0054759 A1 | 3/2003 | Da et al. | |
| 2003/0195008 A1 | 10/2003 | Mohi et al. | |

FOREIGN PATENT DOCUMENTS

| | | |
|---|---|---|
| WO | WO0119111 A1 | 3/2001 |
| WO | WO0165271 A1 | 9/2001 |

* cited by examiner

POSITION DETERMINATION SYSTEM THAT USES A CELLULAR COMMUNICATION SYSTEM

RELATED APPLICATIONS

This application is a continuation of U.S. patent application Ser. No. 10/102,361, filed Mar. 19, 2002, entitled "Position Determination System That Uses A Cellular Communication System," which claims the benefit of U.S. Provisional Application No. 60/340,804 filed Dec. 14, 2001, which are assigned to the assignee hereof and which are expressly incorporated herein by reference.

BACKGROUND OF THE INVENTION

1. Field of the Invention

This invention relates to position location systems that utilize wireless signals to determine the location of a device.

2. Description of Related Art

Existing position location technologies based on GPS use a network of satellites in earth orbit that transmit signals at a known time. A GPS receiver on the ground measures the time of arrival of the signals from each satellite in the sky it can "see". The time of arrival of the signal along with the exact location of the satellites and the exact time the signal was transmitted from each satellite is used to triangulate the position of the GPS receiver. A GPS receiver requires four satellites to make a triangulation and the performance of the resulting position location increases as the number of satellites that can be detected increases.

One problem with GPS arises if only three (or less) satellites can be found, and in such an instance it is not possible to accurately locate the GPS receiver. For example, if the GPS receiver's view of the sky is obstructed (e.g. near a tall building) it may not be possible to locate enough GPS satellites to determine location.

Another problem with GPS relates to the amount of time the GPS receiver requires to scan the sky to locate all available satellites (a "cold start"). GPS signals from satellites are highly directional and inherently weak, and therefore finding all available satellites may consume several minutes, even in an open space. Once the satellites have been located by the GPS receiver, only then can they be easily tracked and quickly relocated by the receiver in order to update position in real time.

It has been suggested to use the existing network of cellular base stations to locate position, in a similar manner as GPS. Theoretically-speaking, the exact location of each base station, the exact time at which the base station is transmitting, and the time of arrival of the base station's signal at a mobile station (e.g. cell phone) can be used to triangulate the position of the mobile station. This technique is referred to as Advanced Forward Link Trilateration ("AFLT"). A critical problem faced by the mobile station is to measure the time of arrival of the signals it is receiving from each base station. The simplest method of doing this would be to make a single measurement of the time of arrival for each signal. In one example a single measurement consists of correlating the received signal with a locally generated copy of the transmitted signal, and searching for the peak of this correlation. The goal is to measure the time of arrival of the earliest arrival path from the base station.

In practice, it has proven difficult to implement an AFLT system that can accurately determine the position of a mobile station. Measuring the time of arrival, which is critical to the AFLT process, is difficult in a non-line of sight and/or a dynamic fading environment where multiple paths from the same transmitter are fading in and out unpredictably. For example, if the mobile station is behind an obstruction, the signal from the base station may reflect once, twice, or more along multiple paths before being received by the mobile station. The signal may also go directly through the building, but it may be received as a very weak signal compared to the stronger reflected signal(s).

In part due to the relatively long distance between the satellites and the GPS receiver, a GPS system is not intended to operate in dynamic fading and/or non-line of sight environments. Typically, a GPS receiver makes a single measurement of each satellite, or sometimes it may make multiple measurements with dynamic integration lengths, to determine the correct integration parameters for centering the dynamic range of the available fixed point processor around the received signal strength. Such an approach is not suitable in an AFLT environment, where multiple paths from the same transmitter are fading in and out unpredictably.

It would be advantageous to utilize cellular base stations for position location purposes. The FCC has mandated that cellular operators provide a system for accurately locating the position of cell phones, for reasons including emergency assistance related to "911" calls. For this and other reasons, an effective AFLT system would be useful.

SUMMARY OF THE INVENTION

A method and apparatus are disclosed herein for effectively utilizing a cellular network of cellular base stations to determine position of a mobile station even in non-line of sight and/or dynamic fading environments, by taking a series of substantially statistically independent measurements of signals from the cellular base stations. The method may be used by itself in an AFLT algorithm; alternatively, in order to enhance performance of a GPS system, the existing network of cellular base stations can be treated as a secondary network of satellites for position location purposes. The AFLT technique, combined with GPS, is referred to as hybrid GPS/AFLT.

A method for determining the position of a mobile station using a plurality of cellular base stations each emitting a unique pilot signal comprises taking a plurality of statistically independent data measurements of the pilot signals from each of the plurality of cellular base stations. Each of the data measurements includes an earliest time of arrival estimate for each pilot signal, thereby providing a plurality of independent measurements of the earliest time of arrival for each of the pilot signals from the plurality of cellular base stations. For each cellular base station, a representative measurement is calculated including the earliest time of arrival responsive to the independent measurements for the cellular base station. At least one of the representative measurements is used to determine the position of the mobile station. In some embodiments, the data measurements further include an RMSE (Root Mean Squared Error) estimate and a time of measurement for each time of arrival, and an energy measurement (e.g. Ec/Io) for all resolvable paths of the pilot signal. In some embodiments the step of calculating representative measurements for a pilot ID includes selecting data measurements and averaging the selected times of arrival that fall within a predetermined window.

The data measurements are taken in such a manner as to be substantially independent from a statistical standpoint; e.g. each data measurement of the same pilot signal is highly likely to be independent from (i.e. substantially not correlated with) all the other data measurements taken of that pilot signal. Statistical independence can be provided by sufficiently separating the data measurements in time, space, frequency or any combination thereof, to provide a high likelihood of independence between data measurements taken of the same pilot signal.

The representative measurements may be used in an AFLT algorithm to determine position; alternatively one or more of the representative measurements may be used together with a GPS algorithm to determine position. In some embodiments the mobile station comprises a cell phone and the method further comprises connecting the cell phone to one of the cellular base stations prior to taking data, and providing a cell search list of cellular base stations in the area from which data measurements may be taken. In embodiments that include a GPS system, the cellular base station can also provide a GPS search list, which can be used to reduce the time necessary to determine position.

In one embodiment a mobile station utilizes a cellular network that includes a plurality of cellular base stations each emitting a unique pilot signal to determine position. The mobile station comprises a cellular communication system for communicating with the cellular base stations, a database that stores a plurality of data measurements including an earliest time of arrival for each pilot signal, including multiple data measurements for each pilot signal, a representative measurement calculation system configured to receive data measurements from the database, and responsive thereto to provide a representative measurement of the time of arrival for each pilot signal, and a position calculation and control system configured to receive the representative measurements for each pilot signal, and responsive thereto determine the position of the mobile station. In some embodiments the mobile station further comprises a GPS communication system, and the position calculation and control system is configured to receive GPS data measurements, and responsive thereto determine the position of the mobile station. In some embodiments the database includes memory that stores an RMSE estimate and a time of measurement for each time of arrival, and the representative measurement calculation system further comprises means for calculating a representative measurement for the RMSE estimate for each pilot signal. Furthermore, the database includes memory that stores an energy measurement (e.g. Ec/Io) for each pilot signal in the database. The mobile station may comprise a cell phone or other mobile device such as a personal digital assistant.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

Overview

A method and apparatus is disclosed for measuring the time of arrival of the earliest arriving multipath by repeatedly taking data measurements from a group of pilot signals and storing a plurality of data measurements for each pilot signal. In one described embodiment, the data measurements are sufficiently spaced out in time that the detected quantities (e.g. energies) of the various received multipaths are substantially statistically independent for each subsequent data-taking cycle. Advantageously, the earliest multipath that might not have been detected during some data measurement cycles due to fading will most likely be detected during other data measurement cycles. After sufficient data measurements have been collected, the contents of the database are used to compute a representative measurement that represents the time of arrival of the earliest received multipath for each pilot signal. In one embodiment, the representative time of arrival for each pilot ID in the database is computed by finding the earliest measurement in the database, and averaging the time of arrival for all measurements within a predetermined window of time.

In order to make multiple independent measurements of the detectable multipaths, in one embodiment measurements are made at different times. In alternative embodiments measurements are made from two or more different receive antennas, or measurements are made of signals from two or more different transmit antennas or any combination thereof.

This invention is described in the following description with reference to the Figures, in which like numbers represent the same or similar elements.

Glossary of Terms and Acronyms

The following terms and acronyms are used throughout the detailed description:

AFLT Advanced Forward Link Trilateration
CDMA Code Division Multiple Access
GPS Global Positioning System
GSM Global System for Mobile Communications
Mobile Station A portable device, such as a cell phone, typically carried by a user whose location is to be determined.
Pilot Signal A signal, typically a psuedo-random sequence, emitted by a cellular station for the purpose of establishing communication with remote devices. Although the term "pilot" is often used in the context of CDMA cellular systems, this term also applies broadly to all other cellular communication systems.
RMSE Estimate. Root Mean Squared Error—An indication of the Ec/Io of a pilot signal.

Table of Variables

Following is a table that sets forth some of the variables discussed herein:

Parameter Description
$D_p$ Maximum number of pilot ID's stored in PPM DB
$D_m$ Maximum number of measurements stored per PN
$RMSE_{MAX}$ Maximum RMSE that can be stored in the PPM DB.

Figure 1:
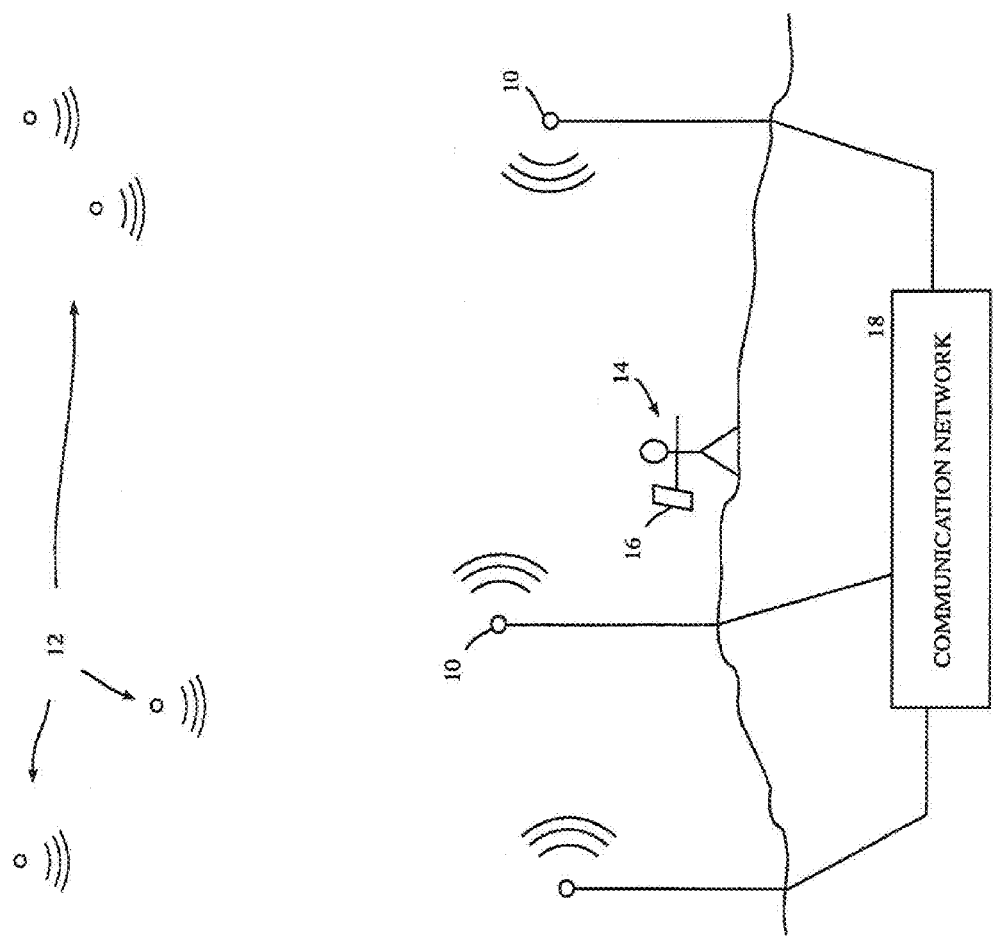
FIG. 1 is a perspective view of a plurality of cellular base stations, GPS satellites, and a user holding a mobile station such as a cell phone.

$N_a$ Window length used to select which data measurements should be used to compute the time of arrival $T_{AGE}$ Delay before aging RMSE's of measurements Overview FIG. 1 is a perspective view of a plurality of cellular base stations shown collectively at 10, GPS satellites shown collectively at 12, and a user 14 holding a mobile station 16 such as a cell phone. The cellular base stations comprise any collection of cellular base stations utilized as part of a communication network for connection with the mobile station. The cellular base stations typically provide communication services that allow a user of a cell phone to connect to another phone over a communication network 18; however the cellular base stations could also be utilized with other devices and/or for other communication purposes such as an internet connection with a handheld personal digital assistant (PDA). In one embodiment, the cellular base stations 10 are part of a CDMA communication network; however in other embodiments other types of communication networks, such as GSM networks, may be used. Each of the cellular stations periodically emits a psuedo-random sequence that uniquely identifies the cell station. The psuedo-random sequence is a series of bits that are useful for the receiver to lock upon. In CDMA parlance this psuedo-random sequence is termed a "pilot signal"; as used herein, the term pilot signal can apply to any cellular system as well as to CDMA systems.

The GPS satellites comprise any group of satellites used for positioning a GPS receiver. The satellites periodically send out radio signals that the GPS receiver can detect, and the GPS receiver measures the amount of time it takes for the radio signal to travel from the satellite to the receiver. Since the speed at which the radio signals travel is known, and the satellites are synchronized to periodically emit their signal every millisecond coincident with "GPS time"; therefore it is possible to determine how far the signals have traveled by determining how long it took for them to arrive. To a user situated in open space, the GPS receiver typically has an unobstructed view of the satellites. Thus when the user is in open space, measuring the time of arrival of the GPS signal is straightforward because it is typically a straight "line of sight" from the satellite to the receiver. However, in the cellular context, a user may be situated in a city with buildings or other obstacles that block the direct line of sight and/or reflect the same signal multiple times along multiple paths, and in such an instance the reflected signal(s) may be the only signal(s) detectable.

Figure 2:
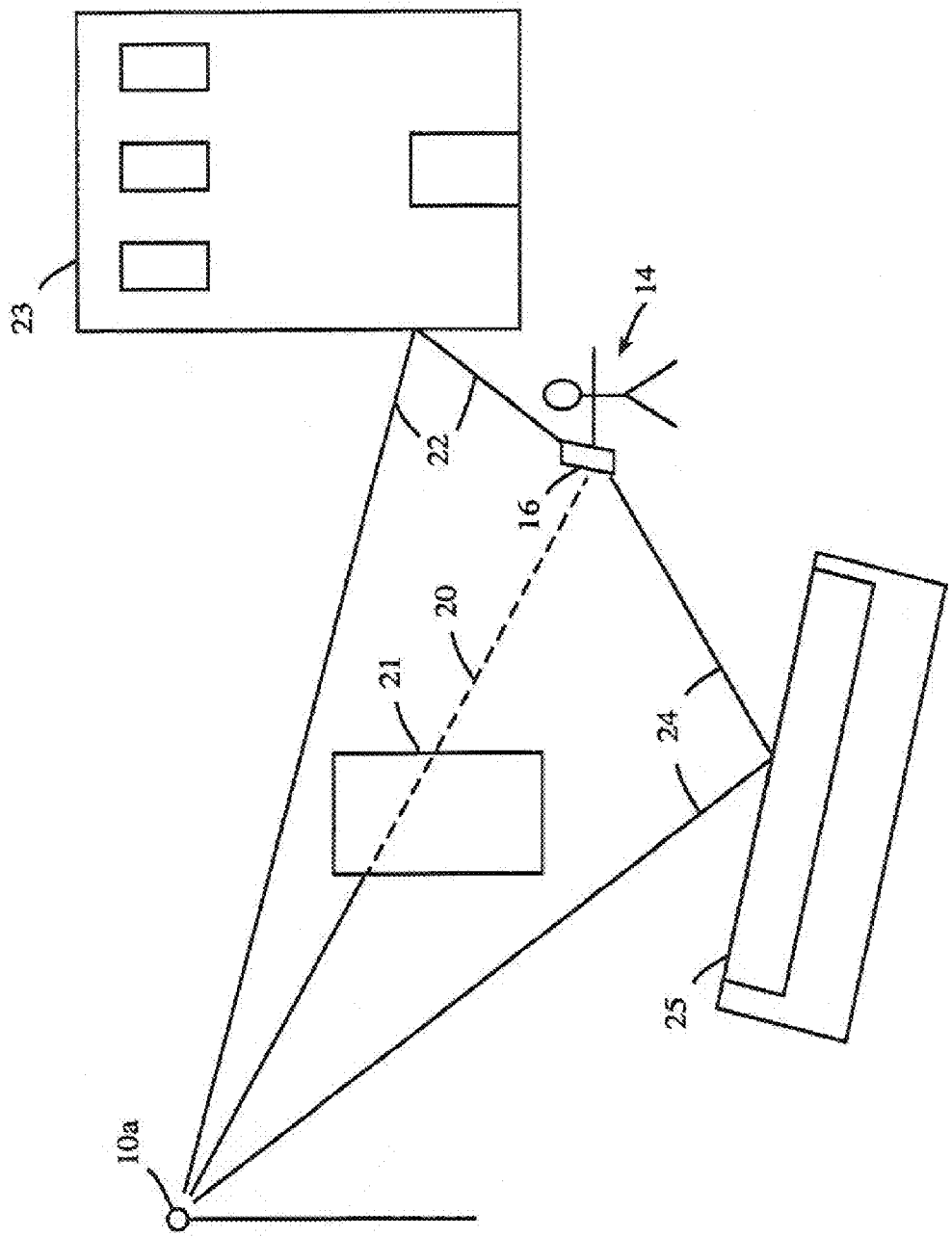
FIG. 2 is a perspective view of a user holding a mobile station in a multipath environment, illustrating the different path lengths of three paths from the same cellular station.

FIG. 2 is a perspective view of a user 14 holding a mobile station 16 such as a cell phone in a multipath environment. FIG. 2 illustrates the multipath problem occurs when the signal from the cellular base station 10a has multiple paths to the mobile station 16. Particularly, a direct signal 20 goes through a first obstruction 21, such as a building, and is attenuated to some extent. A first reflected signal 22 reflects from a second obstacle 23 before being received by the mobile station 16. A second reflected signal 24 reflects from a third obstacle 25 before being received by the mobile station 16. FIG. 2 is simplified for illustration purposes, and it should be clear that other paths may exist, and that in some environments the signal may reflect not just once, but two, three or more times before being received by the mobile station 16. Furthermore, due to attenuation of the direct signal 20 as it passes through the first obstruction 21, one or both of the reflected signals 22 and 24 may be significantly greater in amplitude than the direct signal 20

The amount of time necessary for each signal emitted from the base station 10a to travel to the mobile station 16 depends upon the distance that each signal travels. As each of the signals 20, 22, and 24 are emitted from the cellular base station 10a at the same time, the amount of time difference between the received signals is dependent upon the difference in distance. If amount of the time for the direct signal 20 to travel to the mobile station 16 is $t_o$, then the amount of time for the first reflected signal 22 to travel to the mobile station is $t_o + \Delta t_1$, and the amount of time for the second reflected signal 24 to travel to the mobile station is $t_o + \Delta t_2$. The challenge for an AFLT system is to determine the earliest arriving signal, which hopefully corresponds to $t_o$, the time of arrival of the direct signal 20.

Figure 3:
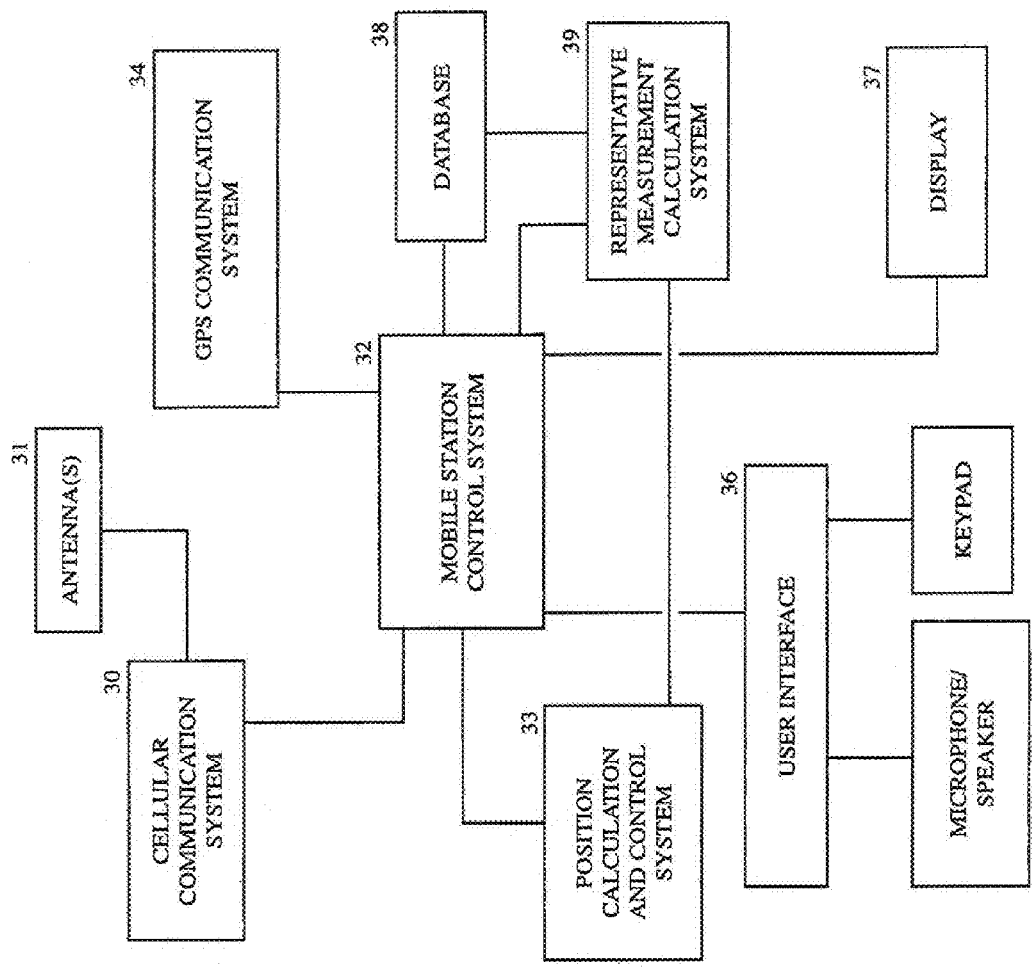
FIG. 3 is a block diagram of one embodiment of a mobile station incorporating cellular and GPS communication systems, a database that holds data measurements, and AFLT and GPS systems.

FIG. 3 is a block diagram of one embodiment of a mobile station incorporating cellular and GPS communication systems, and including systems for AFLT as described herein. This embodiment utilizes both GPS and/or AFLT to determine position; however in alternative embodiments AFLT may be used alone. FIG. 3 shows a cellular communication system 30 connected to one or more antennas 31. The cellular communication system comprises suitable devices, hardware, and software for communicating with and/or detecting signals from cellular base stations. The cellular communication system 30 is connected to a mobile station control system 32, which typically includes a microprocessor that provides standard process functions, as well as other calculation and control systems. A position calculation system 33, connected to the mobile station control system 32, requests information and operations as appropriate from the other systems, and performs the calculations necessary to determine position using any suitable AFLT algorithm, GPS algorithm, or a combination of AFLT and GPS algorithms ("hybrid AFLT/GPS").

In one embodiment, the cellular communication system 30 comprises a CDMA communication system suitable for communicating with a CDMA network of base stations; however in other embodiments, the cellular communication system may comprise another type of network such as GSM. A GPS communication system 34, which comprises any suitable hardware and software for receiving and processing GPS signals, is also connected to the mobile station control system 32. User input is provided via a user interface 36 that typically includes a keypad. The user interface includes a microphone/speaker combination for voice communication services using the cellular communication system. A display 37 comprises any suitable display, such as a backlit LCD display. A PPM database 38, connected to the control system 32, is provided to store information regarding observed data measurements for a plurality of pilot signals. One example of the database is shown in FIG. 6 and discussed with reference thereto. Each pilot signal is uniquely identified in the database by a pilot ID. A representative measurement calculation system 39 is connected to the control system and the database to calculate the representative measurements for each pilot ID responsive to the plurality of data measurements stored in the database, which is disclosed in detail with reference to FIG. 5. In one embodiment, the representative measurements include an earliest time of arrival estimate, an RMSE estimate, and an Ec/Io estimate for all resolvable paths of each pilot signal.

Figure 4:
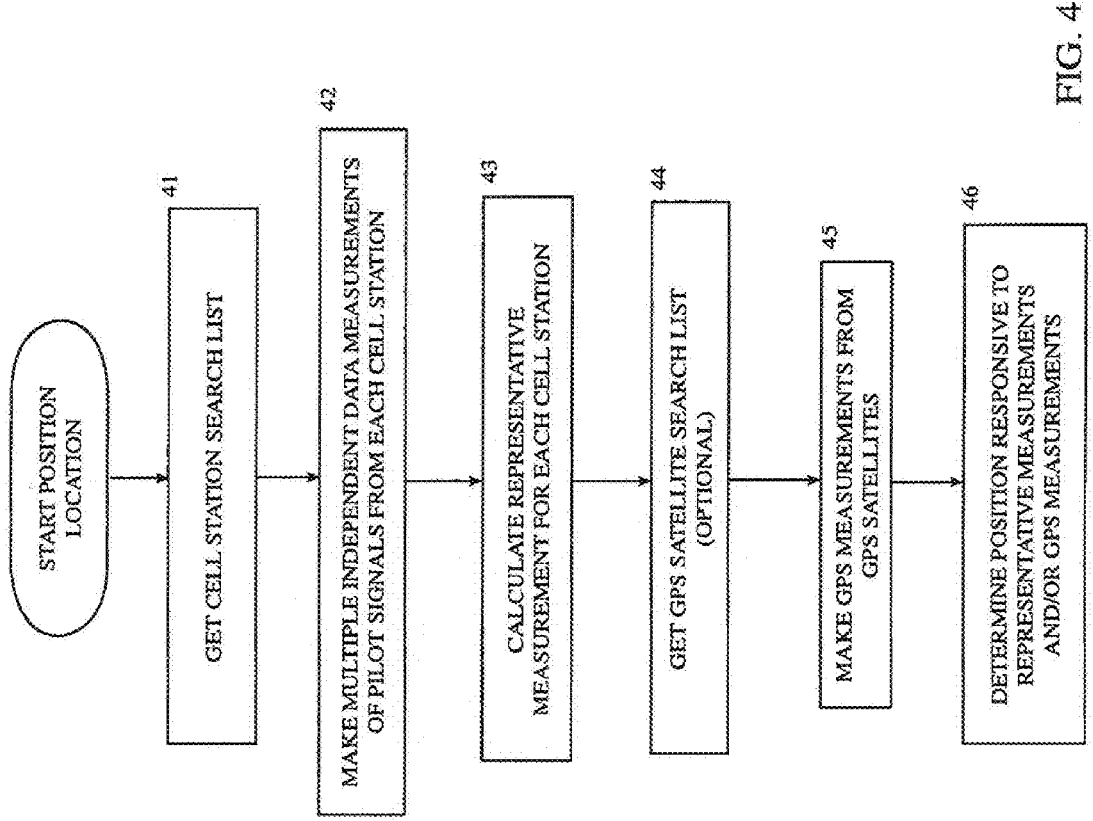
FIG. 4 is a flowchart of operations to determine position of a mobile station.

FIG. 4 is a flowchart of operations to determine position of the mobile station. At 41, a search list of cellular base station neighbors is obtained. The cell search list will be used to search for pilot signals from the cellular stations on the list, and it may also include information useful in finding the pilot signals of the stations on the list.

The cell search list may be obtained in a variety of ways; in one simple embodiment, the cell search list includes all possible pilot signals in a cellular system; however, searching all the possible pilot signals may consume an undesirable amount of time. In order to save time in one embodiment, a local cellular base station communicating with the mobile station can provide the cell search list for the mobile station. Of course, this assumes that the mobile station can establish communication with the local cellular base station (or communication has already been established). Alternatively, such as in the event that communication cannot be established with any cellular base station, the mobile station may simply identify a local cellular base station, and then utilize an almanac stored within itself to determine a cell search list. A cell search list may be inferred from recent activity, or a default search list may be used. For example a cell search list may be inferred from knowledge of the most recent cell station to which the mobile station was connected. If no list can be inferred, the cell search list may simply include all cell stations, even though this may consume an undesirable amount of time. It should be noted that it may possible to detect a cellular base station without establishing communication; i.e., the pilot signal may have enough power to be detected, but there is not enough power to establish communication between the base station and the mobile station.

At 42, a plurality of statistically independent data measurements are taken of the pilot signals from each cellular base station on the cell search list. It may be noted that, even if the strength of a pilot signal is insufficient to establish communication, the pilot signal may still have enough strength to measure the time of arrival and other qualities.

The data measurements are taken in such a manner as to be substantially statistically independent; that is, each data measurement of the same pilot signal is highly likely to be independent from (e.g. substantially not correlated with) all the other data measurements taken of that pilot signal. Statistical independence can be provided by sufficiently separating the data measurements in time, space, frequency or any combination thereof, to provide a high likelihood of independence between data measurements taken of the same pilot signal. The particular technique (or combination of techniques) used to achieve statistical independence varies between embodiments, depending upon objectives such as speed and accuracy, and subject to constraints such as cost, space and energy consumption limitations. Furthermore, it should be recognized that, under any of these techniques channel conditions may occur that would make the measurements correlated to some extent, and accordingly in designing a system that takes independent measurements, assumptions may be made as to which technique (or combination of techniques) will provide substantially independent data measurements most of the time in the expected environment.

One technique to achieve statistical independence is to make a series of data measurements over time, with the time difference between successive measurements at least sufficient to justify the assumption of independence. Typically, the time difference between successive measurements should be chosen such that the fading characteristics of the channel will most likely change from one data measurement to the next. In a non-moving environment, a time difference of at least 20 milliseconds (ms) provides an independent sample, with no maximum time difference except that imposed by practical constraints. Due to practical limitations, the time difference more typically ranges between 100 ms to 2 seconds, and in one embodiment is about 0.5 seconds.

For purposes of implementation, it should be typically assumed that the mobile station is traveling at slow speeds approaching standing still in which theoretically the channel doesn't change; however in practice a fully static channel is usually not achievable. It may be noted that, if the mobile station is in fact moving, the required amount of time spacing will be less due to the difference in location between successive measurements, and accordingly in a moving vehicle the minimum time difference to obtain independence is shorter than for a stationary station.

Another technique to achieve statistical independence is to make independent measurements from two different locations in space. In one such embodiment, data measurements are taken from two or more antennas (see 31 in FIG. 3) where the minimum distance between any two antennas is greater than half the wavelength of the carrier frequency. As a result, the fading characteristics are most likely independent on each received signal. Practical values of antenna separation are generally around half the wavelength of the carrier frequency since usually it is desirable to situate the antennas as closely together as possible.

Still another technique to achieve statistical independence is to make data measurements at two or more different frequencies emitted from the same cellular base station, if the cell stations in the network broadcasts the pilot signals on different frequency channels. In this technique, the frequency separation should be at least sufficient to make multiple independent measurements even in fading environments, if the channel conditions are appropriate for this to be the case. Most of the time the frequency channels are spaced by a bandwidth greater than 1 MHz, and in such networks the assumption of independence is usually accurate.

Again, it should be recognized that any combination of the time difference between measurements, taking measurements from different spatial locations, or measuring multiple frequency channels could be used to achieve statistical independence of multiple data measurements.

In one embodiment, as will be described, the multiple independent data measurements include an earliest time of arrival (TOA) estimate, an RMSE estimate of the path providing the earliest TOA, and an Ec/Io estimate for all resolvable paths of the pilot signal, which will be used to update the Ec/Io for the pilot signal. The data measurements can be stored in a database such as shown in FIG. 6 in which each pilot signal is associated with a plurality of related data measurements. It may be noted in the embodiment shown in FIG. 6, instead of storing multiple values of the total energy (Ec/Io), only a single value of Ec/Io is stored for each pilot ID. With each new data measurement the stored value of Ec/Io for that pilot ID is updated using a suitable filter such as a 1 tap IIR filter.

At 43, the representative measurements are calculated for each cellular base station. Specifically, a single representative measurement is calculated for each cellular base station, responsive to the multiple measurements taken during the search cycle. One representative measurement algorithm is described with reference to FIG. 5. The representative measurements for one embodiment are shown together with the PPM database in FIG. 6.

At 44, a GPS satellite search list is obtained. This is an optional operation, which advantageously provides a search list that can be used by the GPS system to look for satellites and thereby reduce the time necessary to locate sufficient satellites to get a position fix. The GPS search list includes information such as location of each viewable satellite in the sky, and other information that may be useful in locating the satellites and determining the time of arrival of each signal. The GPS search list can be obtained in like manner as the neighbor list at 41, such as by communication with a cellular station or inferred from recent activity in conjunction with an almanac that gives the expected positions in the sky for each GPS satellite. Alternatively, the GPS system can simply search the entire sky; however such a full sky search typically consumes at least several minutes of time.

At 45, GPS measurements are obtained in accordance with suitable GPS procedures. In one embodiment, the GPS communication system first looks for the satellites specified in the viewable satellite list, which can significantly reduce the time required to obtain sufficient GPS signals.

At 46, the position of the mobile station is determined using the representative measurements of the cellular base stations and/or the GPS measurements, as further described in more detail herein, using the position calculation system 33. Using both AFLT and GPS algorithms can be useful: for example if only three GPS measurements can be obtained (four are required for an accurate GPS fix), then a fourth measurement can be obtained from the AFLT representative measurements. Even if four or more GPS measurements can be obtained, the AFLT measurements can act as a check on the accuracy of the GPS fix.

Figure 5:
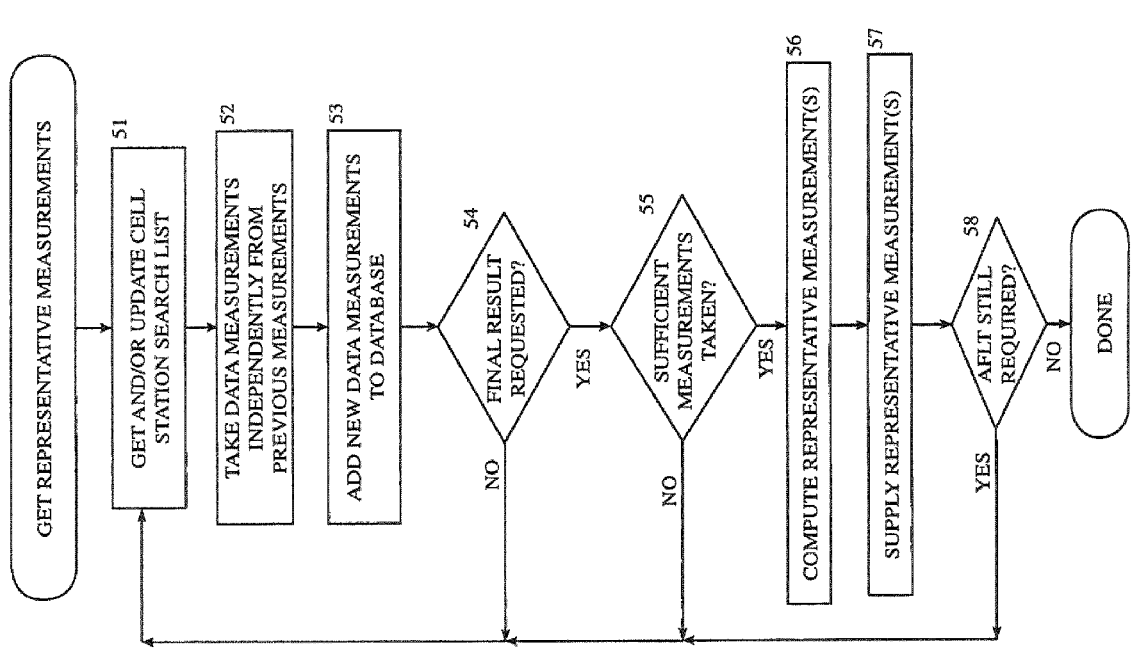
FIG. 5 is a flowchart of operations to obtain a representative measurement from a plurality of data measurements for each pilot signal.
Figure 6:
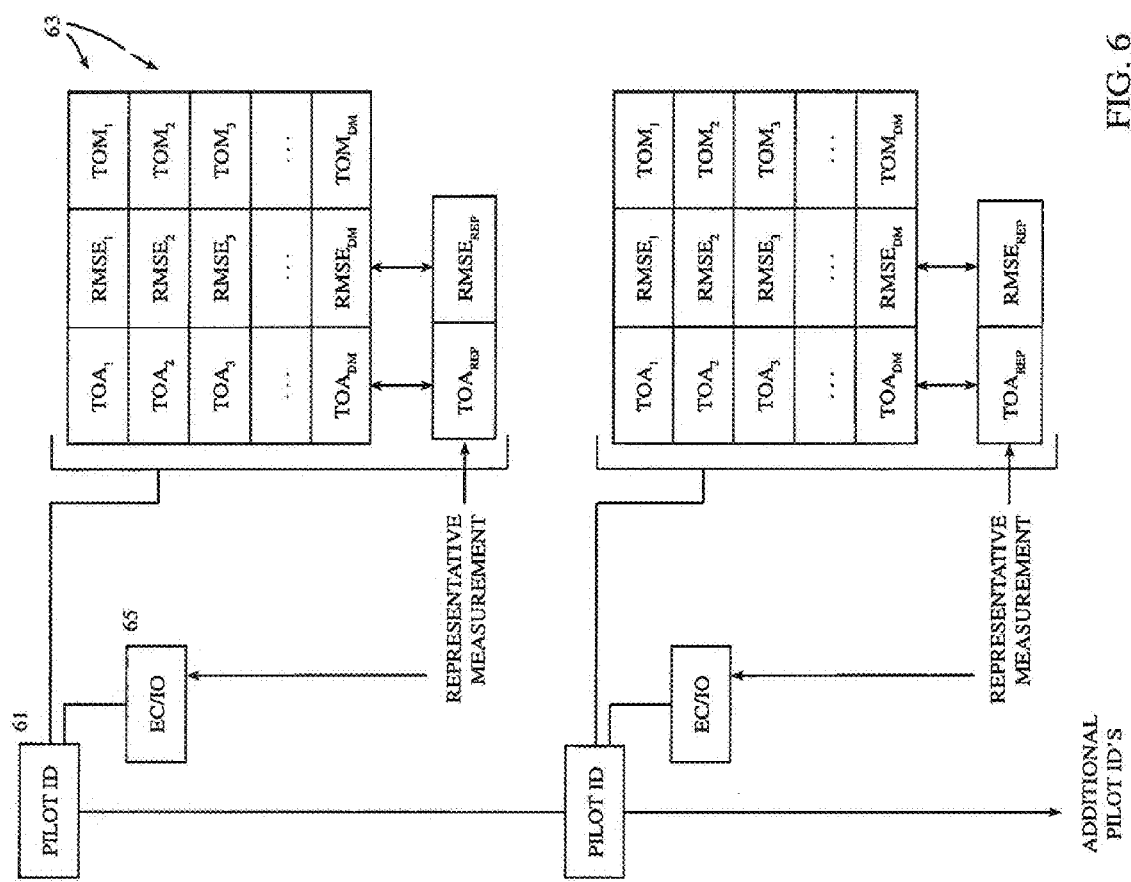
FIG. 6 is a diagram of one embodiment of a PPM database 38 that stores a plurality of data measurements for each pilot signal.

FIG. 5 is a flowchart of operations to obtain representative measurements using the data measurements obtained during previous searches. The following discussion utilizes CDMA terminology and CDMA technology for illustration purposes; however, it should be apparent that other wireless communication systems could also be used. In a CDMA system, each cell base station transmits a unique periodic pilot signal, which is a psuedo-random sequence that allows the receiver to lock upon the pilot and begin communication. Each pilot signal has a distinct sequence offset (sometimes termed "phase") that distinguishes it from all other cell stations in the vicinity. Furthermore, the cell stations are all synchronized so that each emits its pilot signal at the same time. In a CDMA system the pilot signals are periodically repeated every 26.7 milliseconds.

At 51, the cell search list is obtained (as disclosed above at 41, for example), which saves time by focusing search efforts on those pilot signals that have a reasonable likelihood of being usable.

At 52 data measurements are taken of the pilot signals on the search list. Particularly, as each pilot signal is detected, data measurements are made including the earliest time of arrival, and this data is stored in a database. In one embodiment, the data measurements taken for each pilot signal include an earliest time of arrival (TOA) estimate, an RMSE estimate for the path corresponding to the earliest TOA, a measurement time (TOM), and an energy measurement (Ec/Io) for all paths having that pilot signal. It should be noted that box 52 is part of a loop that will be performed multiple times to provide multiple data measurements. At each pass through the box 52, the new data measurements are substantially statistically independent from the data measurements taken in previous passes.

In one embodiment, the data measurements entered into the PPM database for each pilot ID indicate whether the pilot was detected, and if detected, includes a time of arrival, RMSE, and Ec/Io determined as set forth below. Other embodiments may determine these quantities in different ways.

The time of arrival in one embodiment is computed by using the energy of the peak and the energy at +/−0.5 chips away from the peak, and interpolating to determine the value of the peak to the available resolution. The interpolation technique uses a second order polynomial and fits the curve to the three samples of the peak returned by the hardware. The polynomial is given by $$y(x)=ax^2+bx+c$$

where x is the value referenced to the center sample returned by hardware. Given this, solutions to a, b and c are:

$$a=2y(0.5)+2y(-0.5)-4y(0)$$

$$b=y(0.5)-y(-0.5)$$

$$c=y(0)$$

The interpolated peak position is in turn given by −b/2a relative to the peak returned by hardware.

The RMSE metric indicates the Ec/Io of the individual path whose phase is being reported. In one embodiment the RMSE estimate is computed using the following linear formula:

$$RMSE = \frac{0.2}{\frac{E_c}{I_o}} + 10$$

The desired minimum and maximum reported RMSE values are 10 and 223, respectively. This will allow the mobile station to report Ec/Io values from −4 dB to −30 dB. The result is an RMSE that decays exponentially versus Ec/Io in dB. Using the conditional mean formula to convert the searcher output to Ec/Io, the mobile station in one embodiment can compute the RMSE by using the following formula.

$$RMSE = \frac{G^2 MN^2}{5 \times (y - G^2 MN)} + 10$$

where y is the raw searcher output, $G^2$ is a scaling factor of 9/2048 due to truncation and saturation, N is the number of chips coherently accumulated and M is the number of non-coherent sweeps. In one embodiment the MS truncates the RMSE to an 8 bit unsigned quantity with values ranging from 10 to 223. Under this constraint, the computation in the MS can be given as:

$$RMSE = \begin{cases} 10 & y > 0.4G^2 MN^2 + G^2 MN \\ 223 & y \le \frac{G^2 MN^2}{1065} + G^2 MN \\ \frac{G^2 MN^2}{5 \times (y - G^2 MN)} + 10 & \text{otherwise} \end{cases}$$

The Ec/Io metric indicates the total Ec/Io of all of the resolvable paths for a given PN. In one embodiment a resolvable path is defined as any peak above the noise floor for the given search parameters and within a predetermined number ($W_a$) chips of the strongest peak. The total Ec/Io may be computed using the following formula:

$$\left(\frac{E_c}{I_o}\right)_{total} = \frac{\sum_k y_i - kG^2 MN}{G^2 MN^2}$$

where k is the number of resolvable paths and $y_i$ are the searcher outputs for each resolvable path, and G, M, and N are as defined above.

At 53, the most recent data measurements are entered into the PPM database, one embodiment of which is shown in FIG. 6 and discussed with reference thereto. In some embodiments it may be necessary or desirable for older and/or more unreliable data measurements to be removed from the database to make space for the most recent data measurements.

At 54, in one implementation the mobile station is designed to repeatedly search the pilot signals, take data measurements, and enter the new measurements in the database until representative measurements are requested by the mobile station. Of course in other embodiments other strategies may be used; for example one alternative may be simply to repeat the search a fixed number of times (e.g. 20). Until a final result has been requested, the cycle will repeatedly exit box 54 and repeat through the steps 51, 52, and 53 to search the pilot signals, take another measurement and update the database. Once a final result has been requested, then operation will move to box 55.

At decision 55, a determination will be made as to whether or not sufficient data measurements exist in the database to compute a representative measurement. If, at 55, the data is insufficient to calculate a representative measurement, then operation will exit the decision 55 and repeat through the steps 51, 52, 53, and 54 to get another set of data measurements and update the database. Assuming that the mobile station's request for representative measurements at 54 remains outstanding, at the time when sufficient data measurements have been taken, then operation moves on from decision 55 to compute the representative measurements for each pilot signal.

The determination at 55 as to whether or not sufficient data measurements exist can be made in a variety of ways, considering a variety of factors such as the number of measurements that can be stored in the database, the accuracy required, and so forth. In one embodiment, sufficient data measurements exist when a predetermined number (e.g. 10) of data measurement cycles have been completed. In other embodiments other criteria could be used, such as after a predetermined length of time (e.g. 6 seconds) has passed. Combinations can also be used to establish the criteria.

Figure 7:
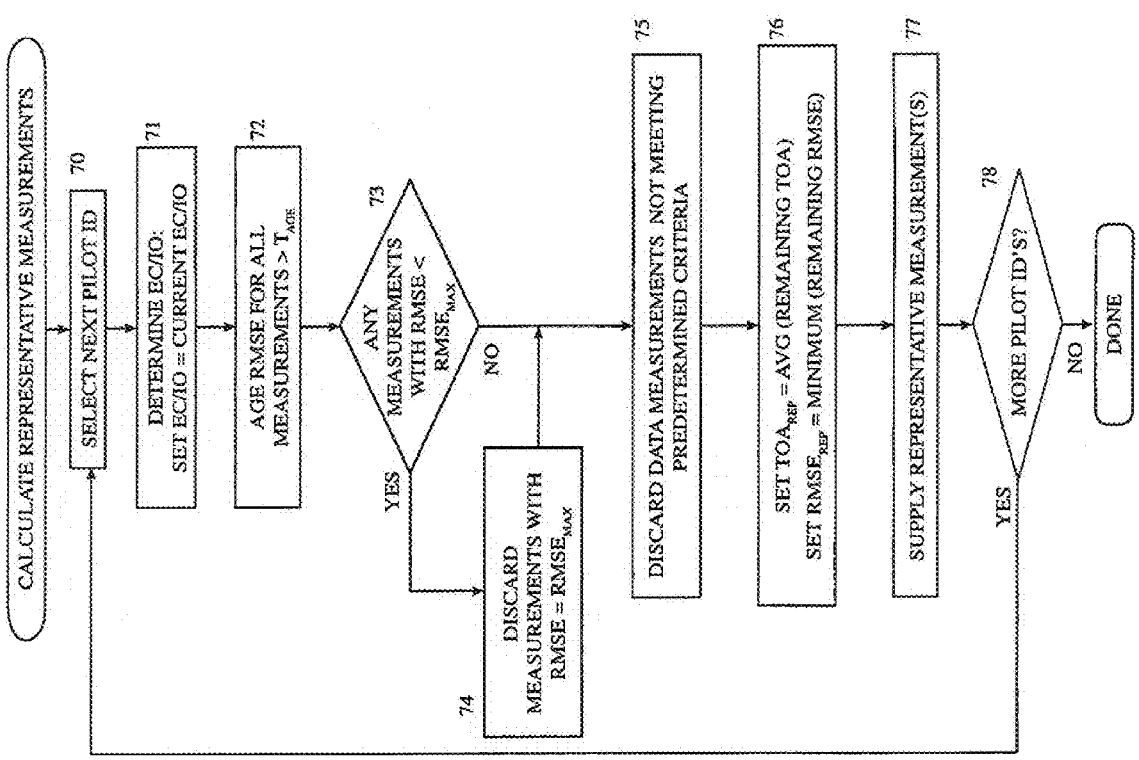
FIG. 7 is a flow chart of operations in one embodiment to calculate the representative measurements responsive to the data measurements.

At 56, the representative measurements are computed as described for example with reference to FIG. 7. Generally the representative measurements are computed responsive to the multiple measurements stored in the database. The representative measurements provide a single measurement of the time of arrival for each pilot signal, and in addition other information, such as an RMSE estimate can be included.

At 57, the computed representative measurements are supplied to the mobile station for use as desired. For example these representative measurements are useful in an AFLT algorithm for position location, alone or in conjunction with a GPS position location system.

At 58, a determination is made as to whether or not AFLT is still required; i.e. whether additional representative measurements are desired. In some circumstances the system may desire to continually update its position using AFLT, such as in a moving car. If AFLT is required, then the cycle will exit the decision 58 and repeat through the steps 51, 52, and 53, the decisions 54 and 55, and the computation 56, to compute another group of representative measurements. If AFLT is not required, then operation exits from the decision 58 and the representative measurement process is now complete.

FIG. 6 is a diagram of one embodiment of the PPM database 38 (FIG. 3) for storing data measurements made during the process of obtaining a representative measurement such as shown in FIG. 5. In this embodiment, the database 38 is termed a PPM (pilot phase measurement) database. For each pilot signal, an identification number (pilot ID) 61 is given. Each pilot ID is associated with a plurality of stored measurements, shown in FIG. 6 in a plurality of rows 63, each representing a separate data measurement associated with the respective pilot ID. The PPM database supports a finite number of pilot ID's ($D_p$) and a finite number of measurements ($D_m$) for each pilot ID. The actual number of pilot ID's and the actual number of measurements supported for each pilot ID varies between embodiments, and typically depends upon a cost vs. benefit analysis appropriate to the particular implementation and other factors such as the speed of search performed. In one embodiment twenty pilot IDs are supported, and each pilot ID can have up to 5 associated data measurements. The PPM database is implemented in any suitable format including memory, control hardware, and software routines; for example the PPM database may be in the form of a relational database that comprises a plurality of related databases.

For each pilot signal searched, the data measurements in one embodiment includes a Time of Arrival (TOA) estimate and an RMSE estimate for the earliest arriving pilot signal path, and a Time of Measurement (TOM). The TOM is provided so that the respective relevance of each data measurement in a group can be determined and given the appropriate consideration and weight.

In one embodiment the TOA's are stored in digital form, in quantized units of time (e.g. chipx16, which is approximately 0.05 microsecond). Two bytes (16 bits) may be used for this value. The RMSE estimates are measured in units of $U_{RMSE}$1 meter. One byte may be used for this value. The TOM values are stored in units of $U_{\supset}$ (0.25) sec from the start of running the algorithm. One byte may be used for this value.

In the embodiment shown in FIG. 6, an Ec/Io memory space 65 associated with the pilot ID 61 stores a single value of Ec/Io for each pilot ID. In alternative embodiments, the PPM database may store each data measurement for the total energy (Ec/Io) together with its TOA, RMSE, and TOM. One advantage of the single-value approach is to reduce memory storage requirements, which can be useful in some implementations. Following each new data measurement of Ec/Io, which indicates the total energy of the pilot signal (including all resolvable paths) detected during a search, the stored value of Ec/Io for that pilot ID is updated using a suitable filter. In one embodiment, the stored value for Ec/Io is calculated using a 1 tap IIR filter as follows:

$$y[n] = \frac{1}{N_f} x[n] + \frac{N_f - 1}{N_f} y[n-1]$$

where $N_f$ is a variable chosen to assign the relative weight to the current and previous values of Ec/Io. In one embodiment $N_f = 2$, which averages the previous and current values. In summary, in conjunction with each set of data measurements taken in one embodiment, the data measurements taken during that cycle are recorded in the database and the Ec/Io value for each pilot ID is updated using the new information obtained during the search. Typically, each additional data measurement is stored until the number of data measurements stored exceeds the available space, and then, the database is updated to determine which of the previous measurements will be removed to open a space for the new data measurement. To update the PPM database, a simple rule may be used such as FIFO (first-in, first-out). The update rule may vary between embodiments, dependent upon on a variety of considerations such as the available storage space and the rate at which the data measurements are taken. In such an embodiment, one principle behind the database update is to store the results from previous search cycles and to compress the data measurement in such a way as to limit memory consumption. Furthermore, the database update rule should be chosen so as to not throw away any information except when necessary to make room for newer information, which allows most of the collected intelligence to be used to calculate the representative measurements. As shown in FIG. 6, all the measurements stored in the database are available for use while calculating the representative measurement.

Reference is now made to FIG. 7, which is a flow chart of operations in one embodiment to calculate the representative measurements responsive to the data measurements.

One goal of the representative measurement calculation is to report the time of arrival of the earliest detectable path. This can be challenging, and there are many ways in which this can be accomplished. In a stationary environment, it is reasonable to report the earliest peak found for each pilot ID regardless of RMSE, and therefore averaging all measurements within a narrow window of the earliest peak helps reduce bias induced by noise in a stationary environment. However, in a moving environment, it may be desirable to place a greater emphasis on the most recent measurements. For this reason, in the embodiment shown in the flow chart of FIG. 7 the RMSE values are aged, and the saturated RMSE values are ignored unless all of the RMSE values for a specific pilot ID are saturated. The RMSE values are not aged for the first $T_{AGE}$ seconds to prevent unnecessarily saturating weak measurements if they occurred in the previous few search cycles. The RMSE reported is the minimum RMSE of all of the measurements used in computing the average time of arrival so that the representative measurement for the RMSE estimate reflects the Ec/Io of the strongest peak seen at that time of arrival.

In one embodiment the discarded data measurements are not physically removed from the actual PPM database, just ignored for the purpose of calculating the representative measurements. Keeping the discarded measurements in the database allows the database's contents to remain unaffected by how often a representative measurement is requested by the mobile station.

Beginning at the top of the flow chart, the goal is to calculate, for each pilot ID, a single representative measurement of the TOA, RMSE, and Ec/Io that can be used in a position determination algorithm. For convenience these representative values will be referred to as $TOA_{REP}$, $RMSE_{REP}$, and $Ec/Io_{REP}$. Although these representative values are most likely the most important variables for an AFLT algorithm, in alternative embodiments different or additional variables could be utilized.

At 70, the next pilot ID for which representative measurements will be calculated is selected. If this is the first pass through the loop, the first pilot ID will be selected at 70. On subsequent passes through the loop each subsequent pilot ID is selected until all representative measurements have been determined for all pilot ID's.

At 71, the representative value of Ec/Io is determined. In one embodiment discussed with reference to FIG. 6, Ec/Io is a single value that is repeatedly updated after each search cycle to provide a running average over all instances in which the pilot signal was searched. Thus, in this embodiment the current value of Ec/Io can be used straightforwardly without further calculation, and thus the representative measurement for Ec/Io is set to the current value ($Ec/Io_{REP}$=current Ec/Io). In alternative embodiments, such as if multiple values of Ec/Io have been stored for a pilot signal, it may be necessary to perform calculations on such stored values of Ec/Io in order to obtain a representative value for Ec/Io. In the PPM database (shown in FIG. 6 for example) for each pilot ID there are multiple data measurements stored corresponding to TOA, RMSE, and TOM. Accordingly, these multiple data measurements must be processed to provide a single value for TOA and RMSE. The representative measurement calculation includes decision-making processes to select which measurements are to be used and which measurements are not to be used to calculate the representative values for TOA and RMSE.

At 72, all measurements for which the TOM is greater than $T_{AGE}$ are aged. One rationale for this is as follows: the uncertainty of a measurement grows as the measurement ages with time in the database. To reflect this growing uncertainty, the RMSE estimates for all the measurements stored in the database are increased dependent upon how old the measurements are. In one embodiment the RMSE estimates older than a predetermined time $T_{AGE}$ are increased linearly. In one embodiment this is accomplished in the following formula:

$$RMSE_{AGED} = RMSE + \max(0, 9 \cdot (\Delta T - T_{AGE}))$$

where $\Delta T$ is the difference between the current time and the time at which the measurement was taken. This formula will not age any RMSE estimates that were taken within the first $T_{AGE}$ seconds; furthermore, older RMSE estimates will be aged linearly.

At 72, the RMSE estimates are aged prior to deciding which measurements to keep in the following steps. In one embodiment to be described, after filtering out and discarding unwanted measurements, the $RMSE_{REP}$ that will be reported will be the minimum of the aged RMSE values.

Generally, "aging" means that less weight will be given to measurements that are further away in time from the last measurement. In one embodiment, the RMSE's are aged linearly. Note that in one embodiment the calculated values for $RMSE_{AGE}$ do not physically replace the RMSE estimate in the pilot phase database; rather the aged RMSE values are used only in the calculation of the representative measurement. This could be useful for example if, during a subsequent calculation of representative values, some of the database values have not changed since the previous representative measurement calculation.

At 73, a decision is made as to whether or not any measurements for the current pilot ID have an RMSE less than the $RMSE_{MAX}$, which is a predetermined quantity such as 255 in one embodiment. If so, then at 74 the measurements having the maximum RMSE are discarded for purposes of calculation, leaving only those data measurements that have an RMSE less than $RMSE_{MAX}$. However, if none of the data measurements have an RMSE less than $RMSE_{MAX}$, then operation continues on using all the data measurements not yet discarded.

At 75, all data measurements not meeting a predetermined criteria are discarded for calculation purposes. In one embodiment, all data measurements whose TOA is not within a predetermined window of time (Na) from the earliest remaining TOA are discarded; i.e., only the measurements within the predetermined window are selected. For example, if the earliest remaining TOA is 16 microsecond, and the predetermined window $N_a$ is determined to be 3 microsecond, then all data measurements whose TOA is greater than 19 microsecond are discarded; i.e. all data measurements from 16 microsecond up to and including 19 microsecond are kept. The predetermined window of time may be chosen in light of a variety of factors, such as the number of expected multipaths, the number of data measurements stored, among others.

At 76, the remaining measurements (i.e. those not discarded in previous steps) are used to calculate the representative values for the pilot ID. In one embodiment the remaining TOAs are averaged to provide $TOA_{REP}$, and the minimum RMSE value of the remaining RMSE estimates provide the representative value $RMSE_{REP}$. In embodiments that utilize quantized values to store the TOA, it may be useful if the averaging is performed in such a way that averages exactly in-between two quantized values be rounded to the earlier value (i.e. if the database contains two measurements one unit apart, the average will be equal to the earlier of the two measurements).

At 77 the representative measurements, now available, are supplied to the mobile station, including the position calculation and control system.

At the decision 78, if representative measurements are to be calculated for more pilot ID's, then operations continue in a loop through boxes 70 through 78 to calculate the representative measurements for each of the remaining pilot ID's. After all the representative measurements have been calculated, then the representative measurement calculation process is done.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

The invention claimed is:

1. A method for determining a position of a mobile station using at least one cellular base station emitting a pilot signal, the method comprising:
   taking first data measurements for resolvable signal paths for a pilot signal from a first base station, the first data measurements including a first earliest time of arrival estimate for the resolvable signal paths and a first time of measurement;
   taking second data measurements for resolvable signal paths of the pilot signal, the second data measurements substantially statistically independent of the first data measurements, and the second data measurements including a second earliest time of arrival estimate and a second time of measurement;
   determining representative data measurements for the first base station based on the first data measurements and the second data measurements, including decreasing weightings of the first and second earliest time of arrival estimates dependent upon the first and second times of measurement; and
   determining the position of the mobile station based in part on the representative data measurement.

2. The method of claim 1, wherein the first data measurements comprise an RMSE estimate of a path providing the earliest time of arrival estimate.

3. The method of claim 1, wherein the first data measurements comprise an energy estimate for all resolvable paths of the pilot signal.

4. The method of claim 1, wherein the second time of measurement differs from the first time of measurement by a time difference sufficient to assume the first data measurements are substantially statistically independent of the second data measurements.

5. The method of claim 4, wherein the time difference is greater than about 20 milliseconds.

6. The method of claim 4, wherein the time difference is in the range of 100 milliseconds to 2 seconds.

7. The method of claim 4, wherein the time difference is about 0.5 seconds.

8. The method of claim 1, wherein the first data measurements and the second data measurements are made from signals received at two different locations in space.

9. The method of claim 8, wherein the two different locations in space comprise two antennas having a separation of greater than half of a wavelength of a carrier frequency of the pilot signal.

10. The method of claim 1, wherein the first data measurements and the second data measurements are made from signals received at two different frequencies.

11. The method of claim 10, wherein the two different frequencies differ by greater than 1 MegaHertz.

12. The method of claim 1, wherein determining representative data measurements for the first base station comprises:
   determining whether each of the first data measurements and the second data measurements meet a predetermined criteria; and
   determining the representative data measurement based on data measurements meeting the predetermined criteria.

13. The method of claim 12, wherein the predetermined criteria comprises a window of time for estimated earliest time of arrival.

14. The method of claim 12, wherein the first and second data measurements comprise a respective first and second RMSE estimate of a path providing the earliest time of arrival estimate, and wherein the predetermined criteria comprises a maximum RMSE value.

15. The method of claim 14, wherein determining representative data measurements for the first base station comprises weighting each of the first and second RMSE estimate based on the respective first and second time of measurement, including decreasing the weighting of any of the first or second RMSE estimates whose time of measurement exceeds a threshold age.

16. The method of claim 1, wherein determining representative data measurements for the first base station comprises averaging the first and second earliest time of arrival estimates.

17. A mobile station that utilizes a cellular network that includes a plurality of cellular base stations each emitting a unique pilot signal, the mobile station comprising:
   a cellular communication system for communicating with said cellular base stations and for receiving pilot signals from each of the plurality of cellular base stations;
   a database that stores a plurality of data measurements based on resolvable pilot signals received from a first of the plurality of cellular base stations and a plurality of data measurements based on resolvable pilot signals received from a second of the plurality of cellular base stations, each of the data measurements including data substantially statistically independent of other data measurements for a respective base station, wherein each of the data measurements includes an earliest time of arrival estimate for resolvable pilot signals and a time of measurement;
   a representative measurement calculation system configured to receive the data measurements from said database, and responsive thereto to provide a representative measurement of the time of arrival for each pilot signal, wherein the representative measurement calculation system is configured to decrease weightings of the earliest time of arrival estimates of the data measurements dependent upon the times of measurement; and
   a position calculation and control system configured to receive said representative measurements for each pilot signal and responsive thereto, to determine the position of the mobile station.

18. The mobile station of claim 17, wherein said database includes memory that stores an RMSE estimate for each earliest time of arrival estimate, and said representative measurement calculation system further comprises means for calculating a representative measurement for the RMSE estimate for each pilot signal.

19. The mobile station of claim 17, wherein said database includes memory that stores a total energy value for each of the pilot signals received from each of the plurality of cellular base stations.

20. The mobile station of claim 17, further comprising:

a GPS communication system; and wherein said position calculation and control system is configured to receive GPS data measurements and determine the position of the mobile station based on the GPS data measurements and the representative measurements for each pilot signal.

21. A mobile station that utilizes a cellular network that includes a plurality of cellular base stations each emitting a unique pilot signal, the mobile station comprising:

means for taking first data measurements for resolvable signal paths for a pilot signal from a first base station, the first data measurements including a first earliest time of arrival estimate for the resolvable signal paths and a first time of measurement;

means for taking second data measurements for resolvable signal paths of the pilot signal the second data measurements substantially statistically independent of the first data measurements, and the second data measurements including a second earliest time of arrival estimate and a second time of measurement;

means for determining representative data measurements for the first base station based on the first data measurements and the second data measurements, including means for decreasing weightings of the first and second earliest time of arrival estimates dependent upon the first and second times of measurement; and means for determining the position of the mobile station based in part on the representative data measurement.

* * * * *